United States Patent [19]

Corvasce et al.

[11] Patent Number: 5,545,680
[45] Date of Patent: *Aug. 13, 1996

[54] HYDROPHILIC POLYMER COMPOSITE AND PRODUCT CONTAINING SAME

[75] Inventors: Filomeno G. Corvasce, Mertzig; Tom D. Linster, Gilsdorf, both of Luxembourg

[73] Assignee: The Goodyear Tire & Rubber Company, Akron, Ohio

[ * ] Notice: The term of this patent shall not extend beyond the expiration date of Pat. No. 5,374,671.

[21] Appl. No.: 262,672

[22] Filed: Jun. 20, 1994

Related U.S. Application Data

[63] Continuation-in-part of Ser. No. 17,894, Feb. 16, 1993, Pat. No. 5,374,671.

[51] Int. Cl.$^6$ .............................. C08L 9/00; C08K 3/04; C08K 3/22; B60C 1/00
[52] U.S. Cl. .................... 524/47; 524/52; 524/571; 524/575.5; 524/577; 524/579; 524/580; 152/450; 425/28.1; 264/216
[58] Field of Search ............................... 524/47, 52, 571, 524/575.5, 577, 579, 580; 152/450; 425/28.1; 264/216

[56] References Cited

U.S. PATENT DOCUMENTS

| | | | |
|---|---|---|---|
| 2,161,445 | 6/1939 | Ball | 524/48 |
| 3,095,391 | 6/1963 | Brockway et al. | 527/312 |
| 3,645,940 | 2/1972 | Stephens et al. | 524/50 |
| 3,673,136 | 6/1972 | Buchanan et al. | 524/50 |
| 3,830,762 | 8/1974 | Abbott | 524/47 |
| 3,914,499 | 10/1975 | Siefert | 428/292 |
| 4,983,651 | 1/1991 | Griffin | 524/47 |
| 5,095,054 | 3/1992 | Lay et al. | 524/47 |
| 5,116,667 | 5/1992 | Zimmerman et al. | 428/220 |
| 5,212,219 | 5/1993 | Griffin | 524/17 |
| 5,234,977 | 8/1993 | Bastioli et al. | 524/47 |
| 5,374,671 | 12/1994 | Convasce et al. | 524/47 |

FOREIGN PATENT DOCUMENTS

| | | |
|---|---|---|
| 404723A2 | 6/1990 | European Pat. Off. . |
| 404727A3 | 6/1990 | European Pat. Off. . |
| 404728A2 | 6/1990 | European Pat. Off. . |
| 409788A2 | 7/1990 | European Pat. Off. . |
| 409789A2 | 7/1990 | European Pat. Off. . |
| 606754 | 7/1933 | Germany . |

OTHER PUBLICATIONS

Novon Debuts Two Degradable Resins, Begins Building Plant, *Plastics News*, Jun. 18, 1991.
Abstract of JP–312329, filed Nov. 27, 1991, and published as JP–05170976–A, Jul. 9, 1993.

*Primary Examiner*—Nathan M. Nutter
*Attorney, Agent, or Firm*—David E. Wheeler

[57] ABSTRACT

By mixing a hydrophilic polymer into an elastomer matrix, elastomers loaded with hydrophilic polymer are prepared which have unique properties. In the illustrated method, a hydrophilic polymer is mixed with an elastomer base polymer. In one embodiment, the hydrophilic polymer forms fibers in a resulting elastomeric matrix. A base elastomer matrix interspersed with hydrophilic polymer made according to the invention can be used in reinforced elastomeric products such as tires.

17 Claims, 4 Drawing Sheets

HYDROPHILIC POLYMER COMPOSITE AND PRODUCT CONTAINING SAME

RELATED APPLICATION

This application is a continuation-in-part of application Ser. No. 08/017,894, filed Feb. 16, 1993, and now U.S. Pat. No. 5,374,671.

BACKGROUND

The invention relates to a method for processing hydrophilic polymer into an elastomer compound, hydrophilic polymer filled elastomers made by said method, and tires made using hydrophilic polymer filled elastomer.

Prior art composites used in the tire industry comprise rubber compositions, for example composites based on styrene butadiene rubber (SBR), polyisoprene rubber, polybutadiene rubber, polychloroprene rubber, nitrile butadiene rubber (NBR), ethylene propylene diene monomer rubber (EPDM), natural rubber and mixtures thereof. It is continually a goal in the tire art to provide rubber compounds that enhance traction properties while providing good rolling resistance properties and good wear properties.

Certain hydrophilic polymers may be derived from starch. As described by Novon Products, a Division of Warner-Lambert company, 182 Tabor Road, Morris Plains, N.J., starch consists of two types of glucose polymers, linear amylose and branched amylopectin. The distribution of these two polymers effects the properties of the starch. Although starch in dry form is not thermoplastic, it forms a melt in the presence of a plasticizer such as water. The large number of hydroxyl groups in the starch molecule import a hydrophilic character to the molecule that limits its applicability in the preparation of plastic substitutes based on native starch, but to increase the range of viable applications of starch based plastics in product use, native starches can be blended with degradable synthetics. As little as 1% by weight synthetic polymer greatly improves the stability of the starch based plastic substitutes. Since the goal of Novon is to improve the environment by producing biodegradable plastics, Novon notes that when other degradable polymers are blended with starch, or the starch is modified to improve properties or processability, the rate of biodegradation will change. For Novon, the challenge of developing starch-based plastic substitutes is to improve the properties while maintaining acceptable degradation rates, and quantification of biodegradation rates in wastewater, soil, and compost environments is an important part of the product development process.

Starch materials have been used as model systems in investigations of physical and engineering properties of foods. Isothermal absorption of water in starch gels give low water diffusivities which decrease at lower moisture contents (Fish 1958).

Destructured starch compositions that have dimensional stability and hydrophilic properties have been described by Warner-Lambert in EPA 409,789, EPA 409,788, EPA 404,728, EPA 404,727, EPA 404,723, U.S. Pat. No. 5,095,054, issued Mar. 10, 1992, and Plastics News Special Edition, Jun. 18, 1991 pages 2/29.

It is believed that similar compositions are produced by Archer-Daniels-Midland and Epron Industries, Ltd.

In accordance with the present invention, the inventors herein have theorized that the hydrophilic properties of the starch based polymers, when used as a filler in a tire tread rubber, will provide enhanced traction on wet pavement, because of the wettability of the polymer, while providing good rolling resistance properties on dry pavement.

Accordingly, it is an object of the present invention to provide a method by which the properties of a rubber composite can be optimized for a particular use by adjusting the amount of hydrophilic polymers, and conventional reinforcing fillers (such as carbon black, silica, etc.) in the composite.

Other objects of the invention will be apparent from the following description and claims.

SUMMARY OF THE INVENTION

The invention relates to a method of preparing an elastomer by incorporating 1–50 phr hydrophilic polymer into a base elastomer. The hydrophilic polymer may blend with the elastomer or form fibers therein. If fibers are formed, the fibers may be oriented. The hydrophilic polymer is selected from those having a Tg which varies, dependent on the amount of moisture absorbed therein, from about 150° C. to about 0° C.

In the illustrated embodiment, the hydrophilic polymer is selected from the group consisting of destructured amylose, amylopectin, and mixtures thereof.

Also provided is an elastomer which comprises 1–50 phr hydrophilic polymer which has a Tg which varies, dependent on the amount of moisture absorbed therein, from about 150° C. to about 0° C. The polymer may be present in the elastomer in the form of fibers, especially oriented fibers.

In addition, the invention relates to a pneumatic tire which incorporates the hydrophilic polymer loaded elastomer of the invention in at least one component thereof, preferably in the tread cap.

DETAILED DESCRIPTION OF THE INVENTION

The invention relates to a method of processing an elastomer and elastomers produced by said method. In particular, the invention relates to base elastomers which are reinforced by hydrophilic polymer fillers.

Starch can be used to form hydrophilic, thermoplastic polymers having a melting temperature that depends on the mixing condition of the starch material.

Base elastomers, for example polyisoprene rubber, styrene butadiene rubber (SBR), polybutadiene rubber, nitrile butadiene rubber (NBR), polychloroprene rubber, natural rubber, EPDM (ethylene propylene diene monomer rubbers), and mixtures thereof, can be mixed with a hydrophilic polymer at conventional compounding temperatures, when chemically preparing the hydrophilic polymer in-situ, or at a temperature above the melting point of the polymer, when a thermoplastic starch polymer is used to melt form the hydrophilic polymer. In the present invention, it is preferred that the hydrophilic polymer be prepared prior to its incorporation into the elastomeric matrix. The hydrophilic polymer may comprise 1–50 phr (parts by weight per one hundred parts by weight elastomer), preferably 2–40 phr, and most preferably 3–30 phr of the resulting filled elastomer composition.

Hydrophilic polymers which may be used to provide the elastomer of the invention include polymers based on starches. Examples of such polymers are derived from linear amyloses branched amylopectin, and mixtures thereof. In one embodiment, such polymers have the ability to retain their own identity when being mixed with the base polymer, and accordingly are mixable with the base polymer while not being miscible, and accordingly, are capable of forming fibers in the matrix of the base polymer. The fibers formed may be micro fibers or short fibers, as these terms are recognized by the art, and may have a diameter of 0.00001 mm to 3 mm, a length of 0.0001 mm to 20 mm and an aspect ratio of 1 to 1000.

Sources of such hydrophilic polymers are described in the references cited in the Background above, and said references are incorporated herein by reference.

Although it is preferred that the hydrophilic polymer form fibers in the elastomer, those skilled in the art will recognize that homogeneous blends of a base elastomer and a hydrophilic polymer can also be made and used in accordance with the invention.

Optionally, 0–3% by weight grafting agent may be added to the elastomer, to provide polymeric compatibilizing and potential linking between the base elastomer and the hydrophilic polymer, using techniques well known to those skilled in the art, such as those described in the references cited herein.

Figure 1:
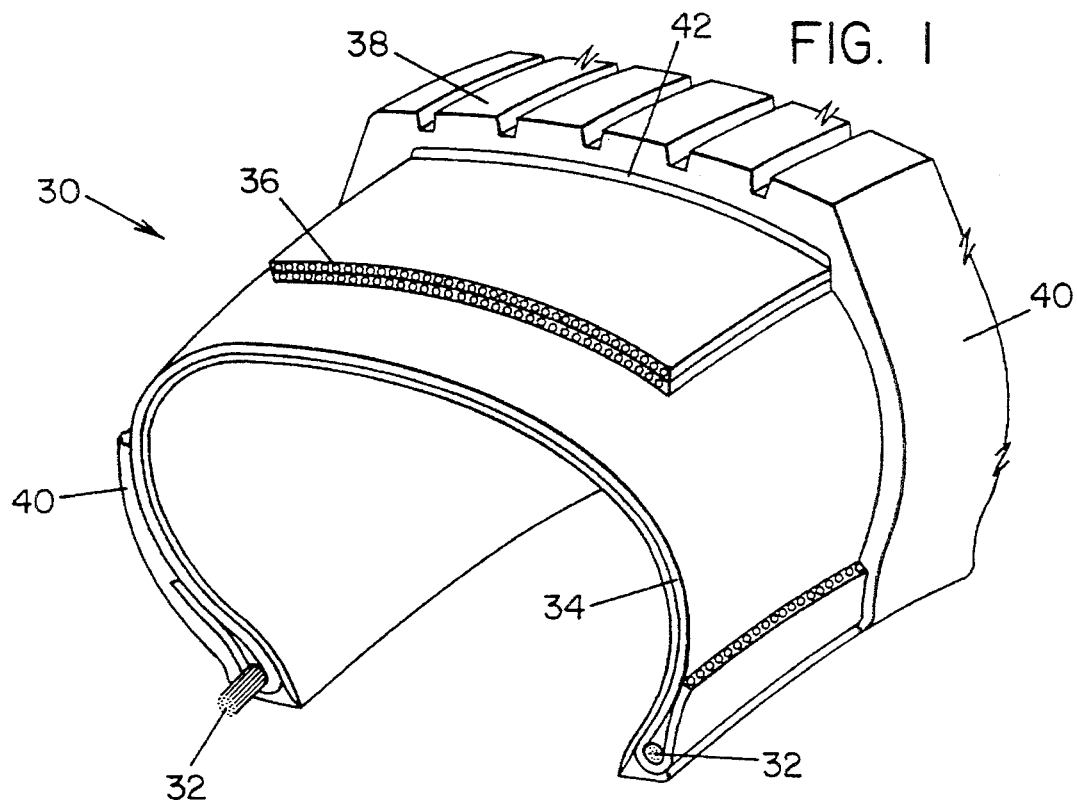
FIG. 1 illustrates a pneumatic tire made using the polymer blend of the invention, and various parts thereof which may contain the polymer blend.

With reference now to FIG. 1, a pneumatic tire 30 which is made using a hydrophilic polymer filled elastomer of the invention is illustrated. It is believed that the hydrophilic polymer filled elastomer made according to the invention may be used most beneficially in the tread cap of a pneumatic tire.

Those skilled in the art will recognize that the elastomer can be used in other parts of a tire if the physical properties are acceptable. For example, it has been discovered that the use of a hydrophilic polymer in an elastomer may reduce the cure time of the elastomer by about half, and the hydrophilic polymer filled elastomers can be used in difficult to cure components of a tire to improve the overall cure of the tire. It is believed that the presence of the hydrophilic polymer also improves the running properties of a tire since the presence of the hydrophilic polymer improves the thermal conductivity of the elastomer component. Since the heat generated within the tire is more easily conducted away from the tire, durability of the tire is improved. Similarly, this concept can be applied to high speed tires where the improved thermal conductivity makes it possible to run tires longer at higher speeds without thermal breakdown.

In another aspect of the invention, the presence of hydrophilic polymers of the invention also improve the electrical conductivity of an elastomer. Increased electrical conductivity may be of practical application in a tire in those instances where the tire tends to develop a static charge or piezo electrical buildup during running. The increased electrical conductivity of the tire can be used to help dissipate the electrical charge. The moisture content of the hydrophilic polymer can be controlled depending on the electrical conductivity required. For purposes of reference, hydrophilic polymers, in their dry state have a nominal moisture content of about 5% by weight, and the moisture content of the hydrophilic polymer may be increased substantially above this level.

In another embodiment of the applications of the present invention, it has been discovered that polymers derived from starch have viscoelastic properties that are dependant on the moisture content of the polymer. In an elastomer matrix, a hydrophilic polymer can act as a filler or a soft phase (a domain having less rigidity than the surrounding elastomer matrix) within a polyphased (having multiple phases with different morphological properties) elastomer matrix. Depending on the moisture content in the polymer phases, the final morphological structure of a compound can be adjusted. In some cases the aspect ratio of the domain, for example, is dependant on the specific viscoelastic properties of the domain during processing. The shape of the starch polymer domains can be fixed during vulcanization of the elastomer. Accordingly, it is possible to develop a specific shape and orientation of a starch polymer domain during calendering and extrusion of the elastomer, and the anisotropic properties of the domain can be controlled to optimize the properties of specific components that require different anisotropic properties. For example, to increase the stiffness of a sidewall, it may be desirable to orient high aspect ratio (length/diameter) fibers, which increase the stiffness of the sidewall rubber, parallel to one another and having the length dimension perpendicular to a bead. The hydrophilic polymer can be processed within the elastomer to have the desired shape and orientation, and upon cure of the elastomer, it will be permanently fixed in the desired orientation. Other such means of developing anisotrophy in an elastomer matrix, and other similar uses of such a matrix, will be apparent to those skilled in the art.

In the illustrated embodiment, tire 30 comprises a pair of beads 32, carcass plies 34 wrapped around beads 32, belts or breakers 36 disposed over carcass plies 34 in the crown area, tread cap 38 disposed over tread base 42 and belts or breakers 36, and sidewalls 40 disposed between tread cap 38 and beads 32.

Since the hydrophilic polymer has low water diffusivities, when the elastomer is used in a tread compound, the hydrophilic property of the polymer in wet conditions will be most apparent on the surface of the tread. As is known in the art, as the moisture content of a hydrophilic polymer is increased, there is a decrease in the glass transition (Tg) of the polymer. In wet conditions, the hydrophilic polymer absorbs water, and the properties of the polymer at the tread surface change, in proportion to the amount of water absorbed, to provide a softer, more tactile tread surface, thus improving traction.

As the moisture content of the polymer increases above about 22%, the Tg of starch based materials approach the Tg observed at temperatures below room temperature.

Particular hydrophilic polymers contemplated for use in the invention can have a Tg which varies from about 150° C. to about 0° C., depending on its moisture content. It is believed that such polymers available from Warner-Lambert, having a Tg which varies from about 120° C. to 20° C. can be used.

By understanding the changing properties of the hydrophilic polymer, and by fine tuning the tread composite using other additives known to those skilled in the art, a tread rubber composition having high loss (high hysteresis) properties (which directly relates to high traction) in moist conditions, made according to the invention, is possible.

The change in Tg observed in the polymer derived from starch is reversible, and in dry conditions, the elastomer matrix containing such a hydrophilic polymer retains a more conventional matrix structure, and is stiffer than the elastomer matrix without a hydrophilic polymer filler, and maintains good rolling resistance properties.

Accordingly, the tire of the invention adapts to have specific properties that are most desirable for the specific weather conditions it encounters.

In the method of preparing the hydrophilic elastomer of the invention, any conventional mixing equipment known in the art may be used, including Banbury® mixers, extruders, and twin screw extruders. The specific properties of the elastomer can be controlled by obtaining specific data on the properties of the specific hydrophilic polymer used, and controlling the amount of the hydrophilic polymer that is used in the elastomer.

About 1 phr to 50 phr hydrophilic polymer in the elastomer, provides a good range between elastomers that have good adhesion and low hydrophilic properties, and elastomers that have high hydrophilic properties.

As is known in the fiber composite processing art, the orientation of fibers and microfibers in a composite can be controlled by the choice of the mixing equipment that is used to mix the composite, and the manner in which equipment is used. Accordingly, when the hydrophilic polymer is in the form of fibers, the orientation of the fibers in the elastomer can be controlled.

A starch derived hydrophilic polymer may be based on amylose, amylopectin, and mixtures thereof, as illustrated by the above named Warner-Lambert patent applications.

Those skilled in the art will recognize that the hydrophilic nature of the polymer used in the elastomer, over time, may enhance the biodegradability of a tire made using said elastomer.

The invention is further illustrated with reference to the following examples.

EXAMPLE 1

To illustrate the concept of the invention, Novon™ 3001 was chosen as the hydrophilic polymer. The hydrophilic polymer was tested in a natural rubber (NR) composition. The control and the filled elastomer had the following compositions.

| *<br>Ingredient | Control Phr | Rubber/Hydrophophilic<br>Polymer Mixture<br>Phr |
| --- | --- | --- |
| NR | 100 | 100 |
| Silica 120 m²/gm | 60 | 60 |
| Hydrophilic | 0 | 10 |
| Polymer |  |  |
| Processsing oil | 4.5 | 4.5 |

*As is conventional in the art, the above composition is a non-productive mix. A cure system and processing aids are added to the mixture to obtain a composition which can be cured into a rubber product.

As can be seen from the formulation, the hydrophilic polymer was used in the composition as an added ingredient, and the other fillers and ingredients were maintained at the same level.

In order to characterize the effect of the hydrophilic polymer on the matrix, additional compositions containing 5 phr, instead of 10 phr, hydrophilic polymer were prepared in the same manner.

The physical properties of the control, and the various elastomer/hydrophilic polymer compositions were evaluated. In the data below, complex stiffness relates to the dry handling properties of a compound.

Dry to wet properties

In order to test the water sensitivity of the composites, the torsion pendulum test was used. Some samples were put in water for one day, and other samples were kept dry.

The loss properties at 0° C. are relevant for properties in wet conditions. The impact on tangent delta and the complex stiffness under dry to wet conditions can be observed.

Treadwear

The complex stiffness at −70° C. increases with the increasing content of hydrophilic polymer. A good correlation between the complex stiffness and treadwear is observed. A slight drop in treadwear is to be expected on a dry surface.

Figure 2:
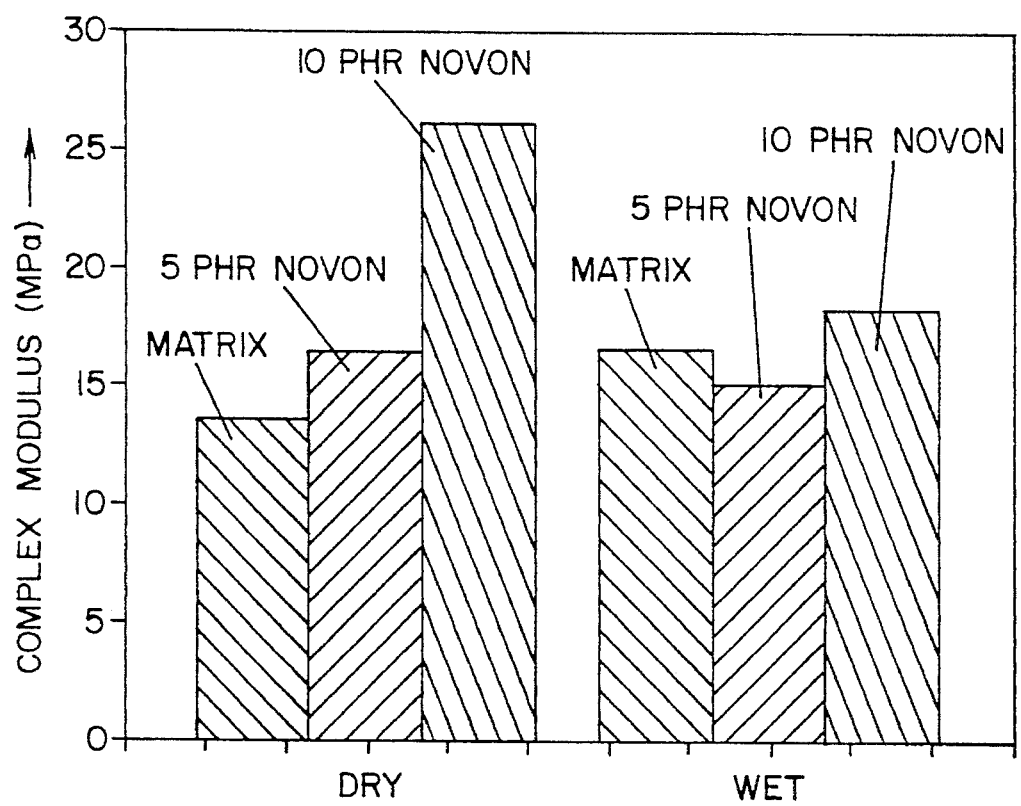
FIG. 2 illustrates complex stiffness properties at 0° C. of a rubber matrix control and the same rubber formulation-loaded with 5 and 10 phr hydrophilic polymer under wet and dry conditions.

FIG. 2 illustrates that the complex modulus at 0° C. of a hydrophilic polymer/elastomer composite is about 57% greater than the control in dry conditions, and slightly greater than the control in wet conditions. A low complex stiffness at 0° C. in wet conditions is particularly indicated for improved wet properties on low mu (coefficient of friction) surfaces.

Figure 3:
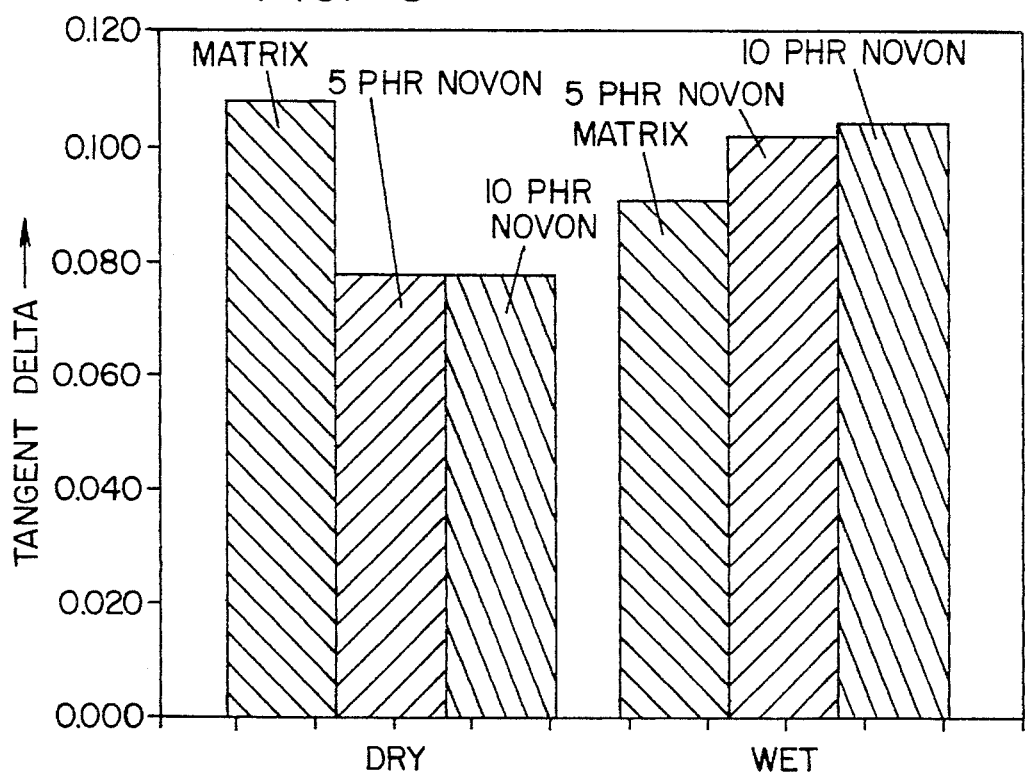
FIG. 3 illustrates tan delta properties at 0° C. of a rubber matrix control and the same rubber formulation loaded with 5 and 10 phr hydrophilic polymer in wet and dry conditions.

FIG. 3 illustrates that the tan delta of the filled elastomers at 0° C. is less than the control in dry conditions and much greater than the control in wet conditions. This suggests much greater traction than the control in wet conditions on low and high mu surfaces.

Figure 4:
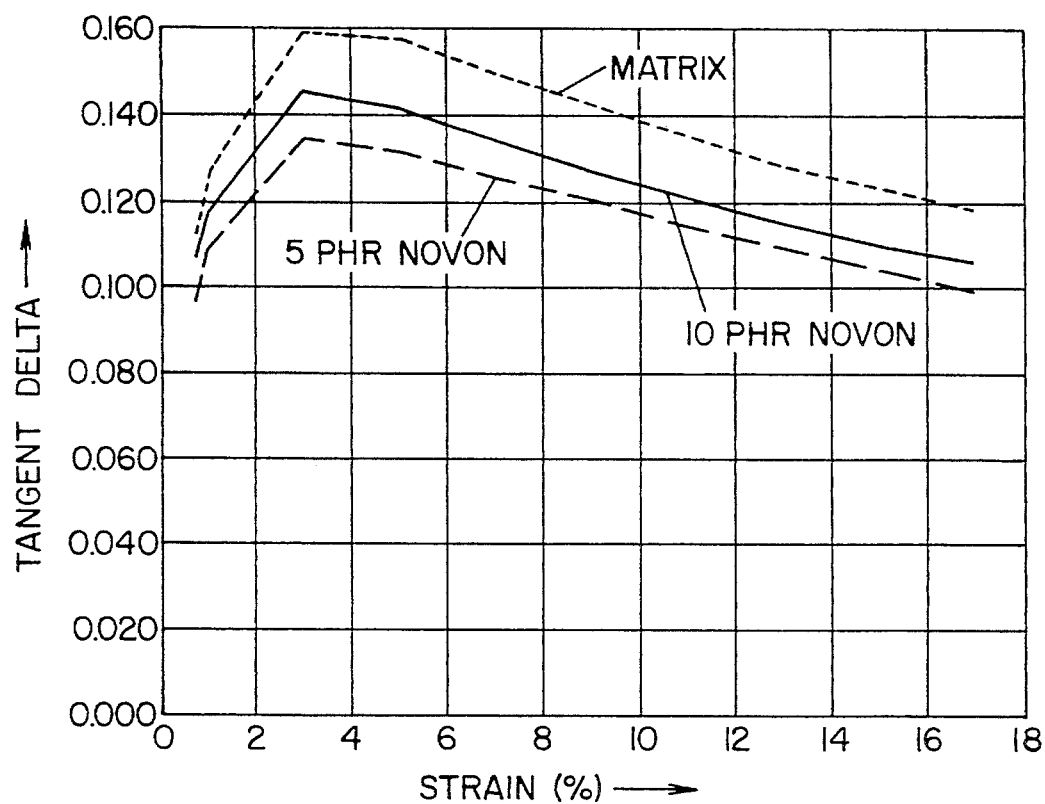
FIG. 4 illustrates tan delta graphed vs. strain for a control and formulations loaded with 5 phr and 10 phr hydrophilic polymer.

In order to measure the effect of strain on the compounds, as a function of the amount of hydrophilic polymer in the composition, FIG. 4 graphs tan delta vs. strain for the control, a 5 phr loaded elastomer, and a 10 phr loaded elastomer. The data suggests an improvement in rolling resistance.

Figure 5:
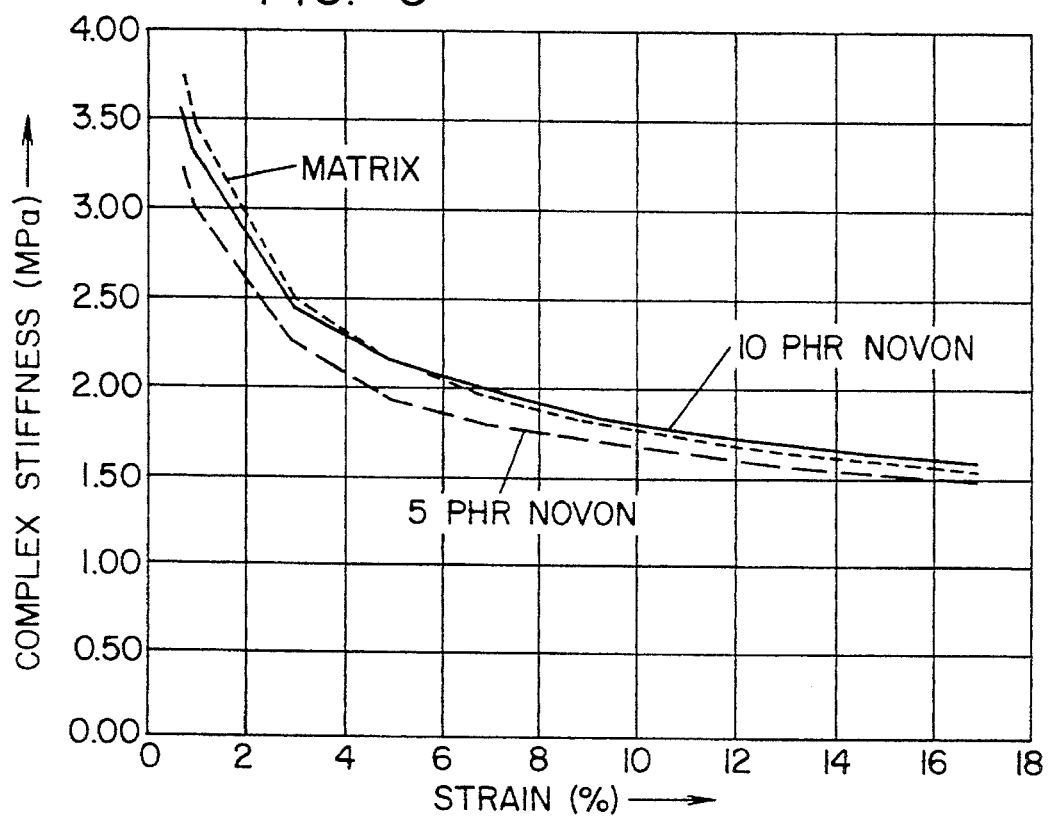
FIG. 5 illustrates complex stiffness graphed vs. strain for the compounds of FIG. 4.

FIG. 5 (similar to FIG. 4) compares the compounds by measuring complex stiffness at different strains.

Figure 6:
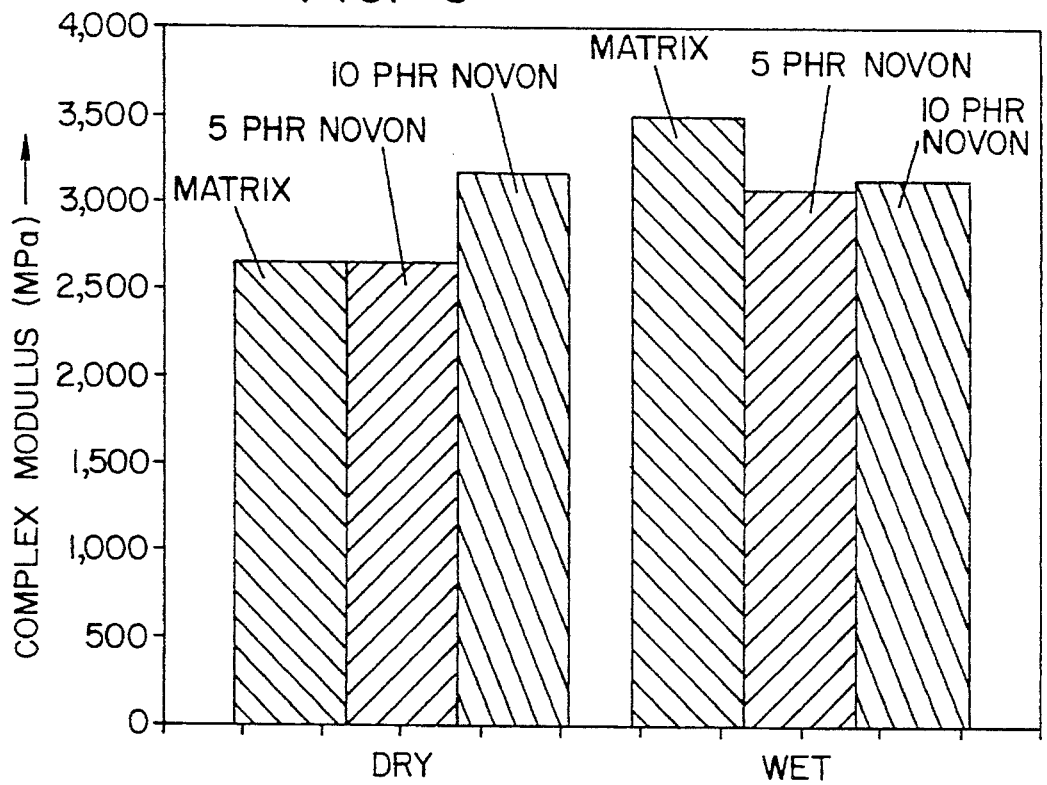
FIG. 6 illustrates the complex modulus, wet and dry, of the compounds of FIG. 4, at −70° C.

FIG. 6 compares the complex modulus of the compounds at −70° C.

Figure 7:
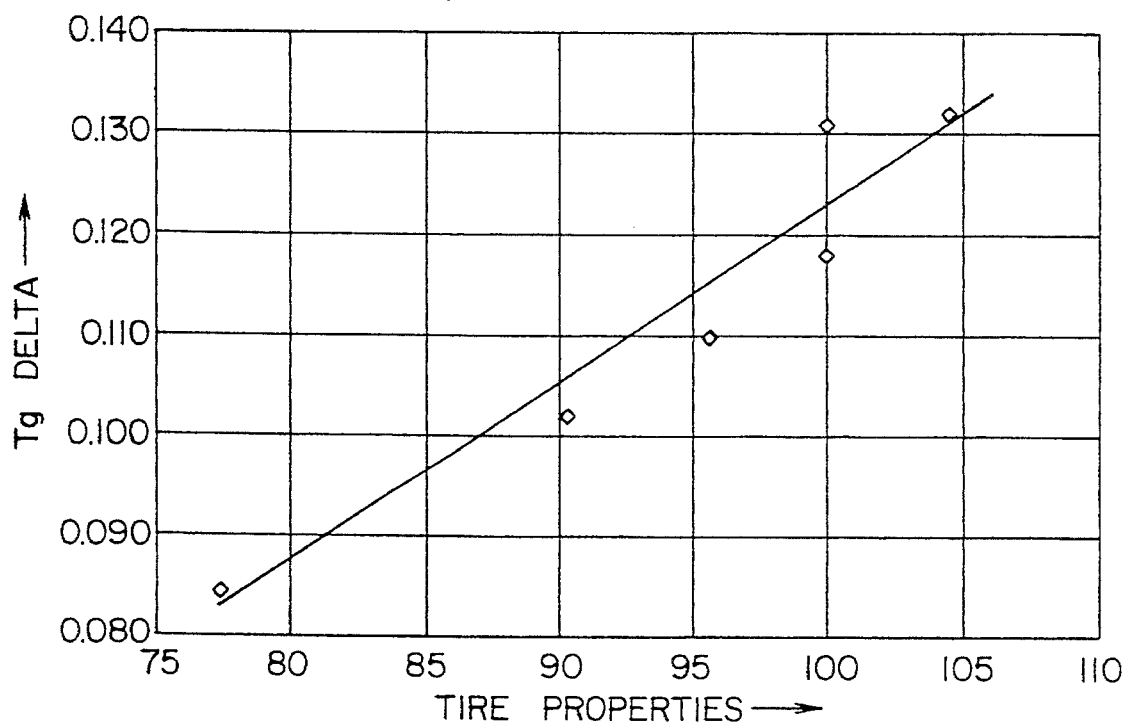
FIG. 7 illustrates a correlation between tan delta and traction properties as developed from tire test results.

FIG. 7 correlates tan delta and traction properties as developed from tire test results. The traction benefits increase as the tan delta increases.

Figure 8:
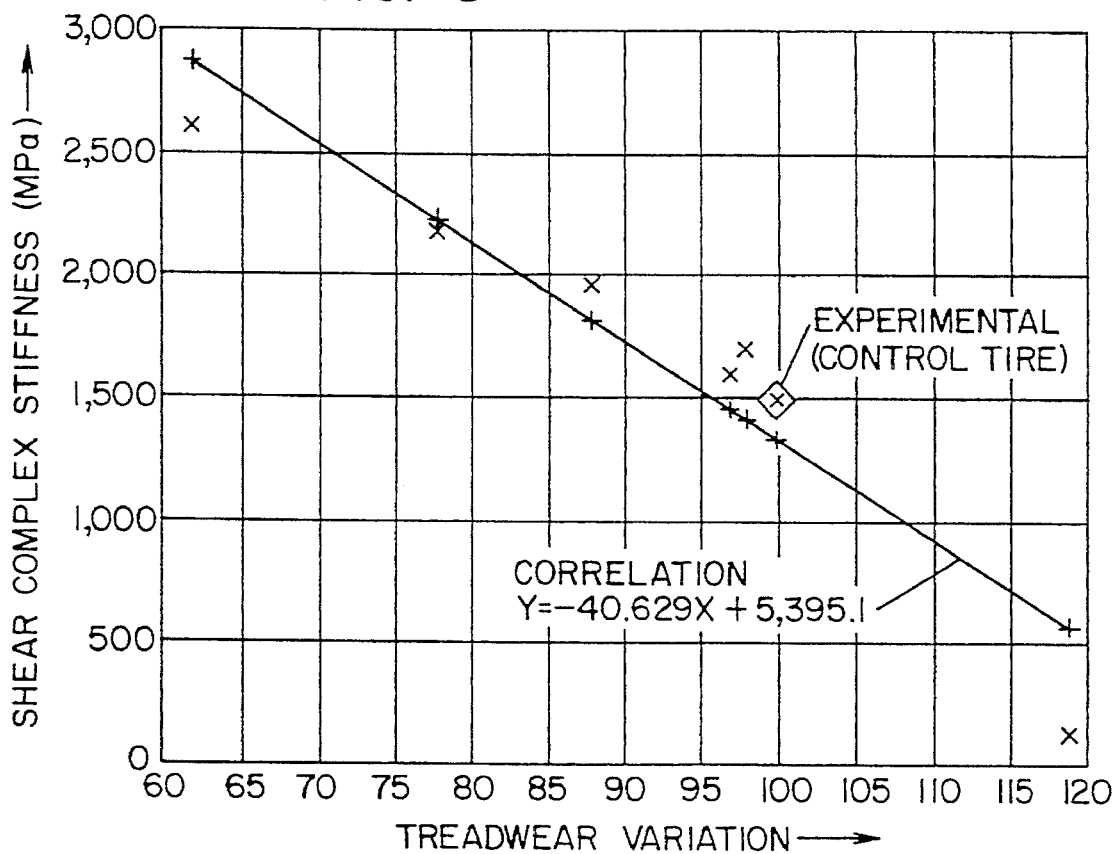
FIG. 8 illustrates a correlation between shear complex stiffness and treadwear variation.

FIG. 8 compares the complex stiffness of the compound to expected treadwear. As can be seen in the Figure, it is expected that treadwear will decrease when the tire is run in wet conditions, but this factor must be weighed against the improvement in traction obtained.

Conclusion

Loss properties increased at 0° C.; with wet vs. dry samples; additionally the complex modulus was decreased.

Loss properties at 60° C. were consistently lower for the hydrophilic filled elastomer, predicting reduced rolling resistance, An improvement in noise properties is expected due to increased damping properties (at low temperature). The 10 phr loaded compound provided an increase of 50% in the integrated loss modulus (2.2 db reduction in the coast down test). Integrated loss modulus is the integration of the loss modulus over a temperature range of −100° C. to 0° C.

EXAMPLE 2

Certain accelerators are susceptible to chemical attachment by water. It is suspected that the cure behavior of compounds containing these accelerators will be affected by the water content of the compound and the humidity conditions of processing and storage. In order to maximize these effects and eventually take advantage of them, we investigated the use of polymers derived from starch at different water content. Significant impact on the cure behavior was achieved.

Experimental

A quantitative investigation into the influence of humidity and water content on cure was carried out using a natural-rubber compound with MBS (N-morpholylbenzothiozole-2-sulfenamide) as the principal accelerator ("Effect of humidity and water content on the cure behavior of a natural rubber accelerated sulfur compound" by J. Butler and P. K. Freakley, Rubber Chemistry and Technology, vol, 65, p. 374). A study of the mechanism by which water affects the cure behavior of the compound revealed that hydrolysis of the accelerator, MBS, would inhibit its scorch-delay action and could produce MBT (2-mercaptobenzothiazole), which would increase the cure rate.

10 phr of starch polymer in a quasi dry state (5% moisture content) and with a high moisture content (by adding water to the starch polymer) was mixed in a NR matrix. The compound matrix used was loaded with silica having a specific surface area of 120 square meters per gram. Static and dynamic properties of the resulting elastomer were compared to the same elastomer composition absent the hydrophilic polymer filler.

It is known that in addition to the moisture present in the compound prior to curing, a certain amount of water will be produced by the reaction between zinc oxide and Lauric acid during vulcanization. In this study, the water added to the starch polymer provided the most significant impact.

| Rheometer Data at 150° C. | | | |
|---|---|---|---|
| | Control NR Matrix | NR Matrix + 10 phr Novon Polymer Dry State | NR Matrix + 10 phr Novon Polymer + Water |
| Moisture Content Green | 0.51% | 0.42% | 2.28% |
| T25 (min) | 8.08 | 9.05 | 3.77 |
| T90 (min) | 9.52 | 10.35 | 5.5 |
| T-1 (min) | 13.5 | 12.8 | 118.25 |
| T-2 (min) | 15.5 | 13.92 | / |

Reversion was improved and T90 was reduced by 40% when water was added to starch polymers loaded into the elastomer.

Modulus 300% was higher (+2 MPa vs. matrix), rebound was higher (60.8 vs. 58.2 matrix at 23° C.), and hardness greater (64.5 vs. 61.3 for the matrix) in the elastomer which was filled with starch polymer to which the water was added.

Green modulus was higher in the elastomer that included the Novon 3001+water formulation.

We observe a moisture content of a rubber matrix made using the starch+water that is substantially equivalent to the moisture content in a rubber matrix control after curing, because of the ability of the starch polymer to release its water content quickly.

While specific embodiments of the invention have been illustrated and described, those skilled in the art will recognize that the invention can be variously modified and practiced without departing from the spirit of the invention. The scope of the invention is limited only by the following claims.

What is claimed is:

1. A method of preparing an anisotropic elastomer comprising the steps of
   (a) providing a hydrophilic polymer having a Tg which varies from about 150° C. to about 0° C. dependant on the amount of moisture therein,
   (b) soaking said hydrophilic polymer in water providing a moisture laden hydrophilic polymer,
   (c) mixing said moisture laden hydrophilic polymer with an elastomer, and
   (d) curing said elastomer.

2. A method of accelerating the cure of an elastomeric material comprising the steps of
   (a) mixing a base elastomer with 1–50 phr hydrophilic polymer to provide an elastomer loaded with a hydrophilic polymer, and
   (b) selecting the hydrophilic polymer such that said hydrophilic polymer has a moisture content of at least 5% by weight.

3. The method of claim 2 wherein said hydrophilic polymer is selected from the group consisting of destructured amylose, amylopectin, and mixtures thereof.

4. A method of increasing the thermal conductivity of an elastomeric material comprising the steps of
   (a) mixing a base elastomer with 1–50 phr hydrophilic polymer to provide an elastomer loaded with a hydrophilic polymer, and
   (b) selecting the hydrophilic polymer such that said hydrophilic polymer has a moisture content of at least 5% by weight.

5. The method of claim 4 wherein said hydrophilic polymer is selected from the group consisting of destructured amylose, amylopectin, and mixtures thereof.

6. A method of increasing the electrical conductivity of an elastomeric material comprising the steps of
   (a) mixing a base elastomer with 1–50 phr hydrophilic polymer to provide an elastomer loaded with a hydrophilic polymer, and
   (b) selecting the hydrophilic polymer such that said hydrophilic polymer has a moisture content of at least 5% by weight.

7. The method of claim 6 wherein said hydrophilic polymer is selected from the group consisting of destructured amylose, amylopectin, and mixtures thereof.

8. An elastomer comprising
   (a) 67 to 99% by weight base elastomer; and
   (b) 1 to 33% by weight hydrophilic polymer containing at least 5% water by weight.

9. The elastomer of claim 8 wherein said hydrophilic polymer is present in said base elastomer in the form of fibers.

10. The elastomer of claim 8 wherein said hydrophilic polymer is a destructured starch.

11. The elastomer of claim 8 wherein said hydrophilic polymer is selected from the group consisting of destructured amylose, amylopectin, and mixtures thereof.

12. A rubber composite pneumatic tire comprising at least a pair of tire beads, carcass plies wrapped around said beads, tread disposed over said carcass plies in a crown area of said tire, sidewalls disposed between said tread and said beads, wherein said tire has at least one component comprising an elastomer comprising, (a) 67 to 99% by weight base elastomer; and (b) 1 to 33% by weight hydrophilic polymer having a water content of at least 5% by weight.

13. The pneumatic tire of claim 12 wherein said hydrophilic polymer is present in said base elastomer in the form of fibers.

14. The pneumatic tire of claim 12 wherein said hydrophilic polymer is selected from the group consisting of destructured amylose, amylopectin, and mixtures thereof.

15. The pneumatic tire of claim 12 wherein said elastomer comprises the tread of said tire.

16. The pneumatic tire of claim 12 wherein said elastomer comprises a sidewall of said tire.

17. The pneumatic tire of claim 12 wherein said elastomer comprises an apex of said tire.

* * * * *